F. CRAMER.
Horse Hay-Fork.
No. 93,520.
Patented Aug. 10, 1869.
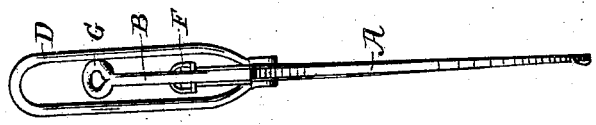
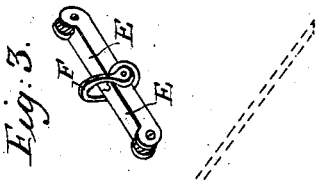
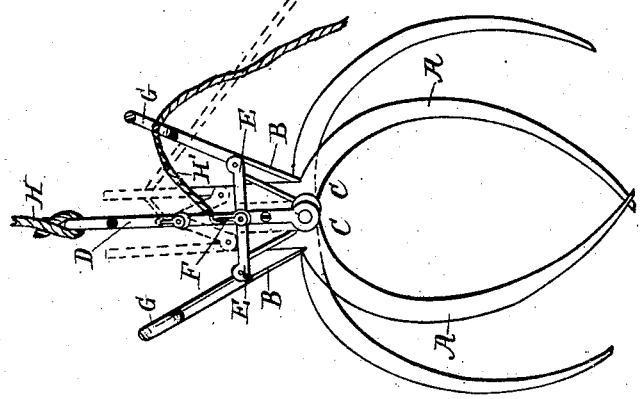
Witnesses;
A. Connolly
E. Man
Inventor.
Francis Cramer,
per Attorney
Thos. A. Connolly

United States Patent Office.

FRANCIS CRAMER, OF CHESS SPRINGS, PENNSYLVANIA.

Letters Patent No. 93,520, dated August 10, 1869.

IMPROVEMENT IN HORSE HAY-FORKS.

The Schedule referred to in these Letters Patent and making part of the same.

*To all whom it may concern:*

Be it known that I, FRANCIS CRAMER, of Chess Springs, in the county of Cambria, and State of Pennsylvania, have invented a new and improved Horse Hay-Fork; and I do hereby declare the following to be a full, clear, and exact description thereof, reference being had to the accompanying drawings, forming part of this specification, in which—

Figure 1 is a front view.
Figure 2 is a side view.
Figure 3 shows locking-levers.

This invention relates to a horse hay-fork, having two curved tines pivoted together without crossing, and constructed with handles extending from the upper ends, and lugs or ears at the junction of the tines and handles, held together by a pivot.

Also, a suspending loop or link attached to said pivot, and a pair of locking-levers pivoted together at their inner ends, and at their outer ends to the handles, all constructed and operated as follows:

In the accompanying drawings—

A A represent the curved tines, formed as seen in fig. 1.

B B are arms or handles extending from their upper ends.

C C are inwardly-projecting lugs, through which a suitable pin, d, is passed, holding them together.

D is an upwardly-extending link or clevis, the sides of which are rigidly attached to the outer end of the pin d, thus allowing the tines to work freely and independently of the link.

E E are equal-sized lever-arms, the outer ends pivoted to the handles B B about midway the length of the latter, and the inner ends together.

F is a link, attached to the pin, connecting the lever-arms together.

G G are rings formed on the ends of the handles B B, as clearly seen in fig. 2.

H is a rope, attached to the clevis D, and

H', a rope or cord attached to the link F, and passed through either of the rings G.

It will be seen that when the tines are closed on a bundle of hay, the handles diverge from the fulcrum-point, so that the toggles E may be pressed down until they are horizontal, thus locking and preventing the tines from parting before it is necessary.

The fork may be then elevated by means of the rope attached to the clevis D, and the hay released, when desired, by drawing the cord H', which unlocks the toggles and opens the tines.

In a fork thus constructed, the clevis D affords a suitable and convenient means by which it is raised, and within which the tines freely work, and does away with the inconvenient method of attaching the elevating cords to the tines or handles.

The rings on the ends of the handles act as guides for the cord attached to the toggle-arms, and serve instead of a pulley-block.

What I claim as my invention, and seek to secure by Letters Patent, is—

A horse hay-fork, consisting of the tines A A, with handles B B having rings G G, the lugs C C, toggle-levers E E, link F, clevis D, and cords H H, when all are constructed, arranged, and operating as described.

FRANCIS CRAMER.

Witnesses:
JAMES DRISKEL,
J. A. WIRTNER.